United States Patent

Frederick

[15] 3,675,876

[45] July 11, 1972

[54] AUTOMATICALLY DISENGAGING, TAPE HANDLER

[72] Inventor: Harold M. Frederick, Birmingham, Mich.

[73] Assignee: Burroughs Corporation, Detroit, Mich.

[22] Filed: April 19, 1971

[21] Appl. No.: 135,249

[52] U.S. Cl. ................................242/198, 274/4 C, 352/74
[51] Int. Cl. ................G03b 1/04, G11b 15/32, G11b 23/04
[58] Field of Search ........................................242/197–200; 352/72–78; 274/4 C–4 E, 11 C

[56] References Cited

UNITED STATES PATENTS

| | | | |
|---|---|---|---|
| 3,599,895 | 8/1971 | Janecka | 242/198 |
| 3,604,714 | 9/1971 | Staar | 274/4 E |
| 3,612,432 | 10/1971 | Johnson | 242/198 |
| 3,620,479 | 11/1971 | Umeda | 242/198 |
| 3,635,423 | 1/1972 | Lennie | 242/198 |

*Primary Examiner*—Leonard D. Christian
*Attorney*—Kenneth L. Miller and Edwin W. Uren

[57] ABSTRACT

A tape handler is provided having a drive coupling mechanism, a part thereof being axially translatable in response to an end-of-tape condition. The handler includes a pivotally mounted carrier forming a pocket to receive and retain a tape cassette, the carrier being releasably secured to the body of the handler, the translatable part having the function of initiating both the release of the cassette and of the carrier, the latter resulting in a separation of the carrier from the handler body sufficient to uncouple tape drive.

18 Claims, 8 Drawing Figures

INVENTOR.
HAROLD M. FREDERICK

PATENTED JUL 11 1972

3,675,876

AUTOMATICALLY DISENGAGING, TAPE HANDLER

BACKGROUND OF THE INVENTION

The invention relates to tape handling equipment and more particularly to tape drive coupling devices.

Prior art discloses manually controlled tape handling devices and other handling devices which are, to varying degrees, automatically controlled. The first device has provision for driving tape, typically from a supply reel to take-up reel, in response to the actuating of a manually operated control or switch. Drive is applied to a tape when, for example, a start switch is manually actuated, supplying electrical power to a drive motor. Drive is continually applied until a stop switch is manually actuated, isolating the drive motor from its source of electrical power. Another typical example of a manually controlled tape handling device provides for manually engaging and disengaging rotary drive to a tape take-up reel or to a tape driving capstan. Both of these types of devices require manual intervention to stop or disengage tape drive.

An improvement of such devices introduced a control or switch responsive to tape presence to halt or disengage tape drive after it had been manually initiated. Recent innovations in this area provide devices responsive to tape presence or motion for halting and disengaging tape drive and which employ various sensing devices for producing a signal output when the tape being monitored is stopped or exhausted. Associated mechanisms, typically electromechanical, then disengage mechanical drive and remove electrical power from drive motors. These devices commonly require monitoring mechanism, some of which employ members bearing directly on the tape, causing wear thereof, and separate disengagement mechanisms.

SUMMARY OF THE INVENTION

The invention resides in the provision of a tape drive coupling device for automatically disengaging drive upon an end-of-tape condition.

Accordingly, it is an object of the present invention to provide a tape handler which will automatically disengage drive upon an end-of-tape condition.

It is another object of the invention to provide a tape handler which will automatically halt rotary drive on an end-of-tape condition.

It is yet another object of the invention to provide a tape handler which will at least partially eject a tape cassette residing therein upon an end-of-tape condition.

It is another object of the invention to provide a tape handler drive coupling device which will be responsive to a cessation of tape motion.

An important aspect of one embodiment of the invention is the use of a semi-helically slotted sleeve to axially extend a shaft residing partially therein upon an angular displacement of the shaft with respect thereto for decoupling rotary tape drive.

An important aspect of a second embodiment of the invention is the use of a pair of parallel plates diametrically disposed and operatively coupled by elongated resilient members extending obliquely and concentrically therebetween, a shaft being centrally affixed to one plate and extending normally through the other, the latter plate being axially slidable along the shaft under influence of the resilient members upon an angular displacement of the former plate with respect to the latter plate for decoupling rotary tape drive.

BRIEF DESCRIPTION OF THE DRAWINGS

These and other objects, aspects and advantages of the invention will be more clearly understood from the following description when read in conjunction with the accompanying drawings, in which.

DETAILED DESCRIPTION OF A FIRST EMBODIMENT OF THE INVENTION

Figure 1:
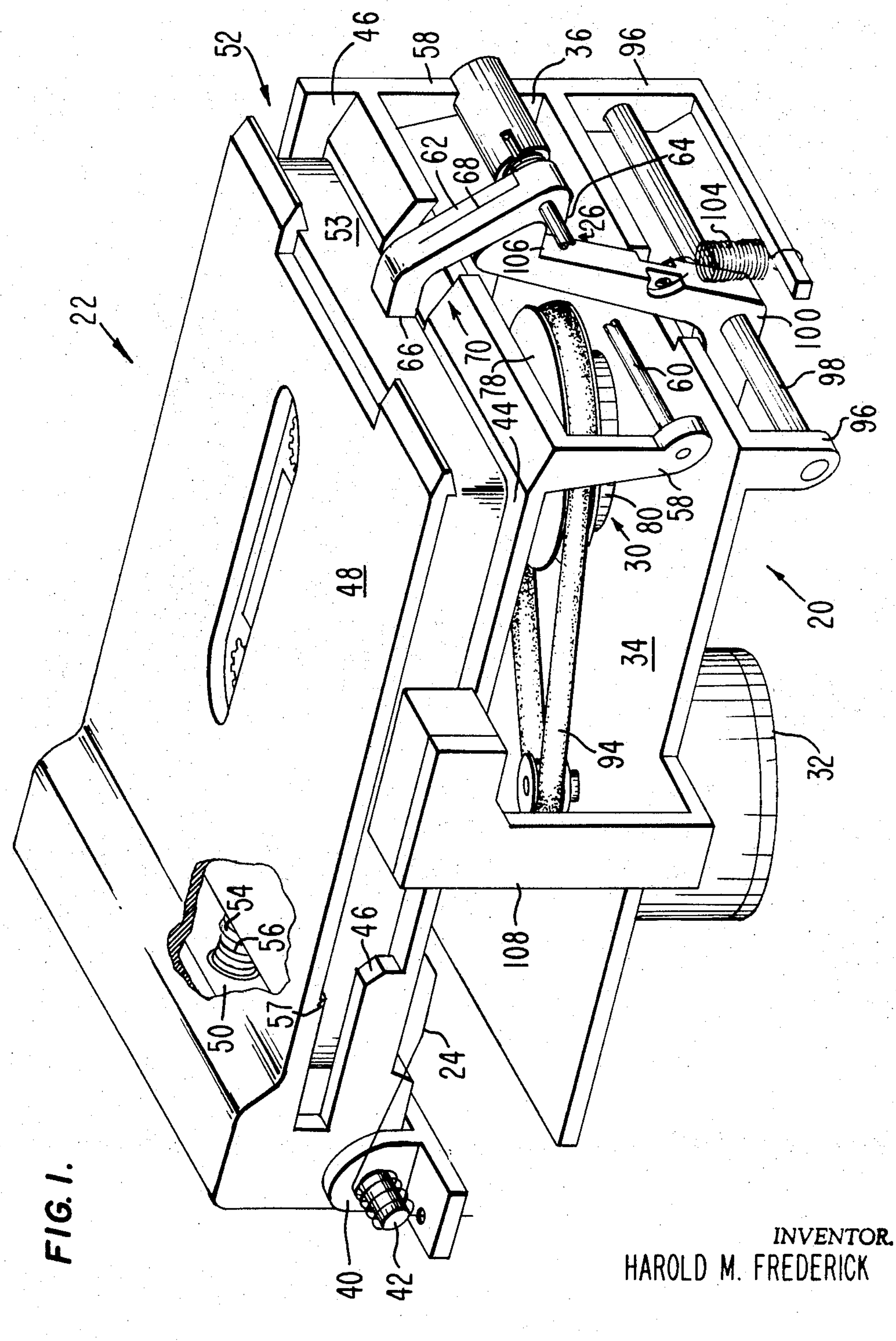
FIG. 1 is a perspective view of an automatically disengaging, tape cassette handler embodying features of the invention.
Figure 2:
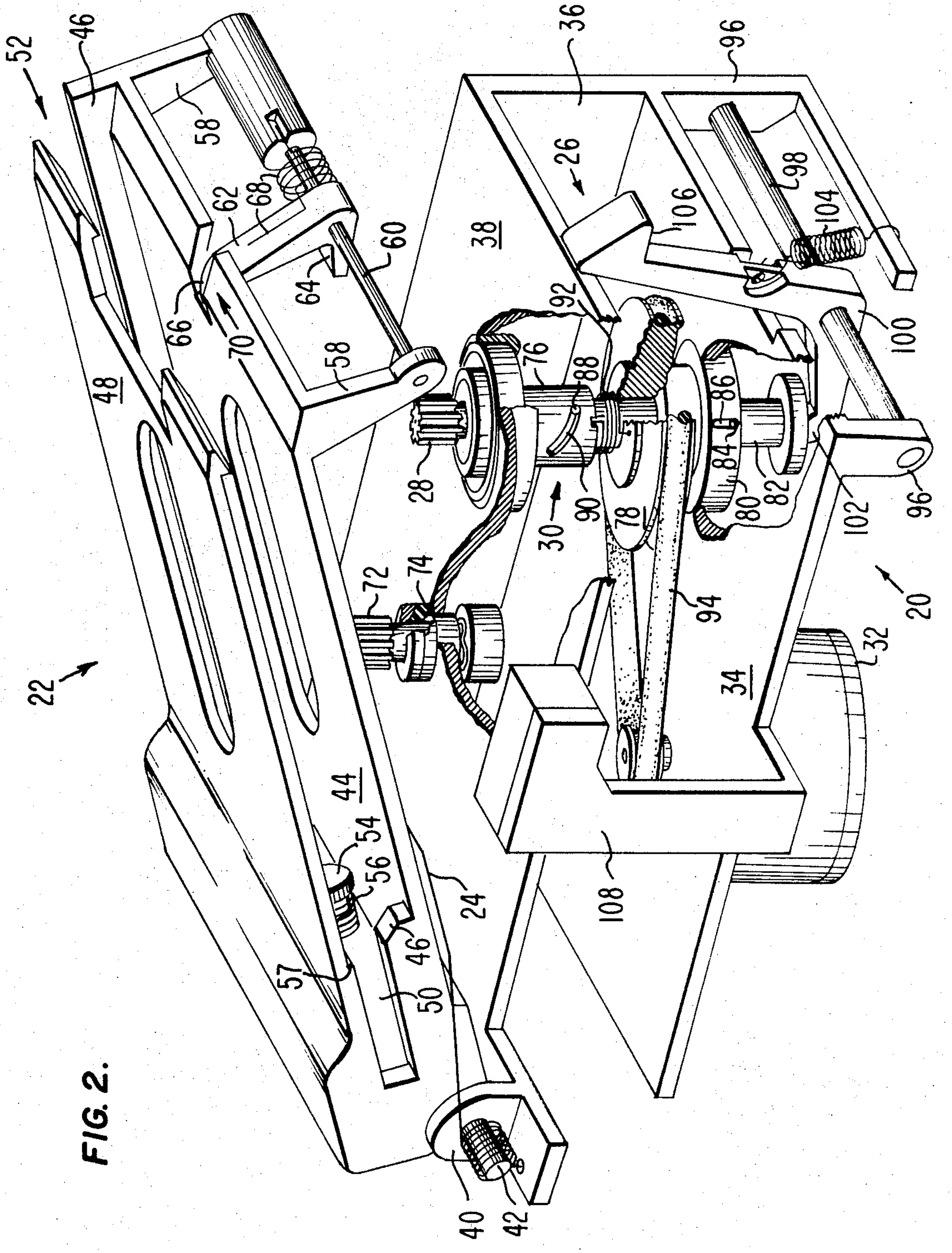
FIG. 2 is a view of the tape cassette handler of FIG. 1 shown in an opened position to receive a tape cassette therein.
Figures 3, 4, 5, 6, 7, 8:
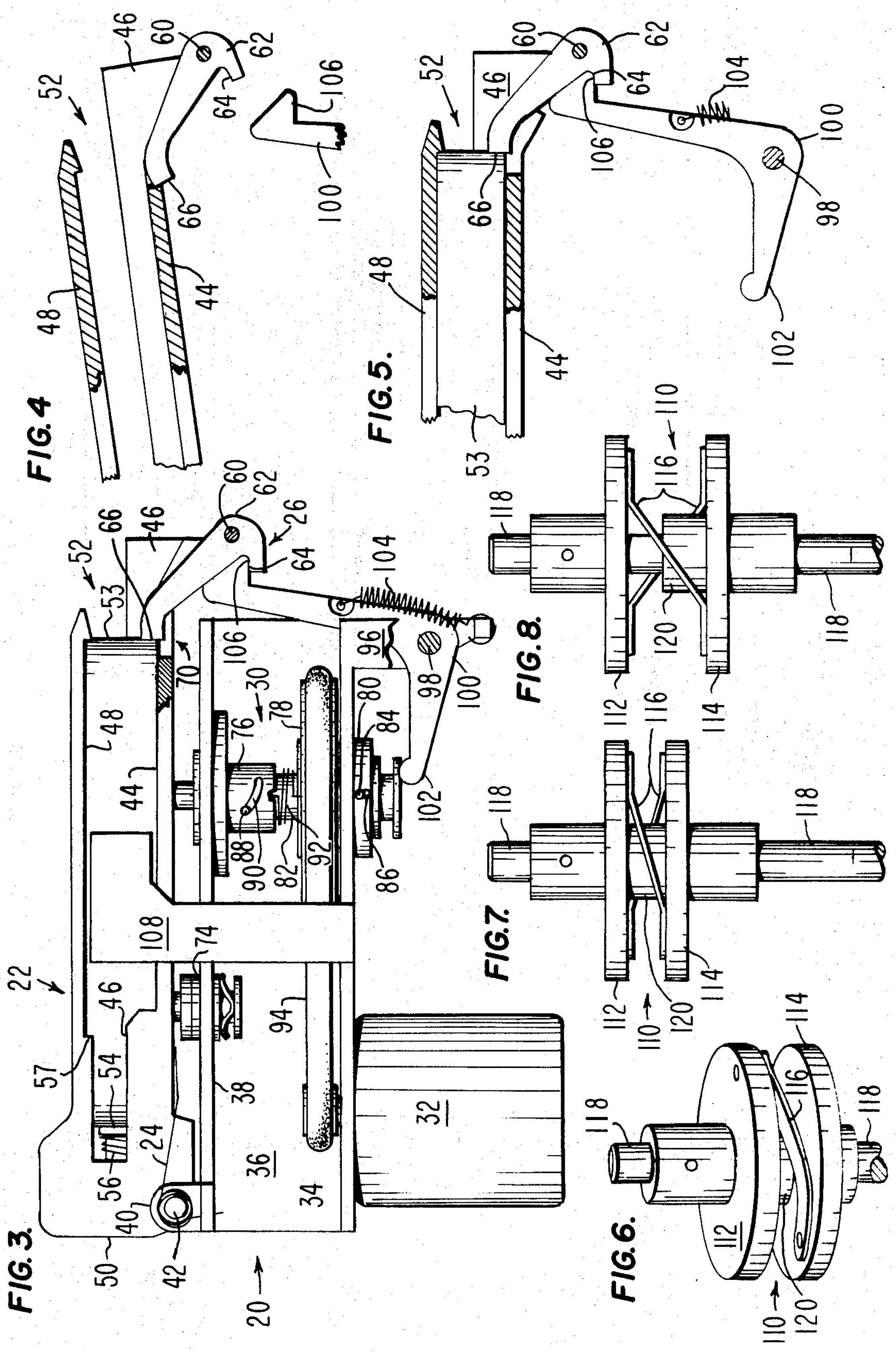
FIG. 3 is a side view of the tape cassette handler of FIG. 1.
FIG. 4 is a partially fragmented view of the latching mechanism of the tape cassette handler positioned to receive a tape cassette and shown removed from the device.
FIG. 5 is a view similar to FIG. 4 showing the carrier in a latched position.
FIG. 6 is a perspective view of a drive coupler shown removed from a second embodiment of the invention.
FIG. 7 is a side view of the drive coupler of FIG. 6 shown in its normal operating position.
FIG. 8 is a side view of the drive coupler of FIG. 6 shown in an extended position.

The tape cassette handler shown in FIGS. 1, 2 and 3 has a supporting means or frame 20, a tape cassette carrier 22, a retracting means or helical torsion spring 24, a disengageable latching means generally indicated at 26, a driven means or spindle 28 and a drive coupler generally indicated at 30. The carrier is pivotally mounted on the frame, the carrier being resiliently biased away therefrom by the torsion spring and disengageably held thereagainst by the latching means. The drive coupler is supported by the frame and couples rotary drive supplied by a motor 32, which may be any one of a number of well-known business machine motors and which is also mounted on the frame, to the spindle.

The frame 20, as shown, has a lower horizontal plate 34 and a vertical plate 36 extending upward therefrom to support an upper horizontal plate 38 parallel to and overlying the lower plate. Atop what will hereinafter be called the rearward end of the upper plate 38 are a pair of upwardly extending ears 40—40. A shaft 42 extends between the ears and provides pivotal support for the carrier 22.

The carrier is shown in FIGS. 1 and 3 in its normal operating position but is shown swung upwardly away from the upper plate 38 in FIG. 2, the carrier being resiliently maintained in this position by the helical torsion spring 24. The carrier itself has a lower carrier plate 44, a pair of partial side plates 46—46 extending upward therefrom and supporting an upper carrier plate 48 parallel to the lower carrier plate. An end plate 50 joins the lower and upper carrier plates at their rearward ends and, together with the side plates, forms a rectangular pocket generally indicated at 52 to slidably receive a tape cassette 53. Mounted on the end plate is a plunger 54 which extends forwardly into the pocket 52 under the influence of a helical, compression-type spring 56 to effectively contact the rearward edge of a tape cassette inserted in the pocket. A stop 57 is formed under the upper carrier plate 48 to abut a corresponding projection on the upper surface of the cassette to thereby limit the rearward travel of the latter. Depending from the forward end of the lower carrier plate are a pair of support arms 58—58. Extending between the arms is a shaft 60 upon which is pivotally mounted a second bell crank 62, a first free end of which forms a catch 64 and a second free end of which forms a stop 66. A helical torsion spring 68 resiliently urges the bell crank in a counterclockwise direction as viewed. The stop end of the bell crank extends through a slot 70 in the forward edge of the lower carrier plate and is biased against the end of the slot by the spring 68 when the carrier is in its unlatched position as shown in FIGS. 2 and 4. A control means or switch (not shown) is operatively coupled to the carrier 22 such that electrical power is supplied to the drive motor 32 when the carrier is swung against the upper plate 38 and is interrupted when the carrier is swung away therefrom.

Journaled upwardly through the upper horizontal plate 38 of the frame 20 is a supply reel spindle 72. A resilient friction device 74 is secured to the spindle shaft to apply rotational drag to the spindle. A circular sleeve 76 is journaled downwardly from the upper horizontal plate parallel to and spaced forwardly from a supply reel spindle 72. A take-up reel spindle 28 is affixed coaxially to the sleeve and extends upwardly from the upper plate. A pulley 78 coaxially underlies the sleeve and has a hub 80 extending downwardly through the lower plate 38, wherein it is journaled. A drive shaft 82 extends upwardly through the hub and pulley and into the sleeve. A limit pin 84 extends normally from the shaft through an axially aligned slot 86 in the hub. A drive pin 88 extends normally from the shaft through a semi-helical slot 90 in the sleeve. The shaft is permitted only axial travel with respect to the pulley within the limits imposed by the length of the slot 86 in the hub, and it is permitted only helical travel with respect to the sleeve within the limits imposed by the slot 90 in the sleeve. A helical torsion spring 92 rotatably couples the sleeve and pulley, normally maintaining the shaft in its uppermost position, the drive and limit pins being resiliently urged against the uppermost ends of their respective slots as shown in FIG. 3. For the sake of illustration, the shaft is shown in its downwardmost position in FIG. 2 prior to being restored to its normal position under the influence of the spring 92. A drive motor 32 depends from the lower plate 34 and supplies rotational drive to the pulley 78 by way of a belt 94. If the belt length is sufficient, the pulley may be rigidly affixed to the shaft 82, thereby becoming axially translatably therewith.

Depending from the lower plate 34 are a pair of arms 96-96. Extending between the arms is a shaft 98 which pivotally supports a first bell crank 100, a first free end 102 of which effectively abuts the lower end of the drive shaft 82, under the resilient influence of a helical spring 104, and a second free end of which forms a pawl 106 engageable with the catch 64 of the second bell crank 62 when the carrier 22 is swung against the upper plate 38 as shown in FIGS. 1, 3 and 5. Extending upwardly from the lower plate 34 to a position adjacent one side of the carrier is an arm 108 which provides support for a read and/or write head.

DESCRIPTION OF A SECOND EMBODIMENT OF THE INVENTION

A second embodiment of the tape cassette handler, which has certain advantages relevant to construction and cost, has the same basic configuration as that previously described, with the exception of the drive coupler generally indicated at 30 in FIGS. 2 and 3. The alternate-type drive coupler generally indicated at 110 in FIGS. 6, 7 and 8 has a first plate 112 and a second plate 114 mutually parallel and spaced apart and operatively coupled by a pair of elongated resilient members 116—116 extending obliquely and concentrically therebetween. A drive shaft 118 extends through the second plate and is affixed perpendicularly to the first plate, the second plate being axially slidable along the shaft under influence of the resilient members upon an angular displacement of one plate with respect to the other. A limiting hub 120 is mounted on the second plate and extends toward the first plate to limit the axial travel of the former toward the latter. The drive coupler may be constructed of individual parts or may be formed as a unit of hardened plastic material having an inherent flexibility. When used in the tape cassette handler, the drive coupler would be rotatably mounted on the frame 20. A pulley would be affixed to the end of the drive shaft remote from the plates, or perhaps, if the belt length is sufficient, to the second plate itself, to operatively couple rotary drive to the shaft; and a take-up reel spindle would be disposed atop the first plate. The disengageable latch would be operatively coupled to the second plate.

OPERATION OF THE FIRST EMBODIMENT OF THE INVENTION

The carrier 22 of the tape cassette handler shown in FIG. 2 is in position for receiving a tape cassette. To load, a cassette is inserted in the pocket 52 and manually forced rearward against the resilient opposition of the ejecting plunger 54 until the cassette projection limits against the stop 57. The carrier is then manually swung downwardly toward the upper plate 38, the supply reel spindle 72 and the take-up reel spindle 28 engaging their respective reels in the cassette, until the pawl 106 of the first bell crank 100 engages the catch 64 of the second bell crank 62. During the latching procedure, the second bell crank is pivoted in a clockwise direction as viewed until the stop 66 formed of one free end is effectively in the ejection path of the cassette. Details of this are illustrated in FIGS. 4 and 5. The tape cassette handler will thus be positioned as shown in FIGS. 1 and 3. As the carrier is latched, it actuates a control switch (not shown) which supplies electrical power to the drive motor 32. The motor will apply rotary drive by way of the belt 94 to the pulley 78, rotating the drive shaft 82. The drag caused by the tape and the friction device 74 being insufficient to overcome the tension of the helical torsion spring 92, the sleeve 76 and the take-up reel spindle 28 will also rotate with the shaft. Tape will wind onto the take-up reel of the cassette and unwind from the supply reel, passing by the read and/or write head mounted on the support arm 108. The trailing end of the tape is anchored to the supply reel; and, when this end is reached, the tape will stop moving. When the tape stops, the rotation of the take-up reel and its associated spindle 28 will be stopped also. When the spindle stops, the sleeve 76 connected thereto also stops. The shaft 82, however, is still being rotated by the motor 32. The tension of the helical torsion spring 92 will be overcome, and the shaft will rotate within the sleeve. As the shaft rotates with respect to the sleeve, the drive pin 88 will be forced to conform to the semi-helical slot 90 in the sleeve through which it extends, forcing the shaft, to which the pin is attached, in a helically downward direction. The shaft is free to slide axially with respect to the pulley 78 and hub 80 by virtue of the axially aligned slot 86 in the hub through which extends the limit pin 84 which is also attached to the shaft. The shaft is shown in FIG. 2 in its downwardmost position.

As the shaft translates downward, it forces the first free end 102 of the first bell crank 100 downward, pivoting the latter in a counterclockwise direction. This disengages the pawl 106 from the catch 64 of the second bell crank 62, and the carrier 22 will be swung upwardly away from the upper plate 38 under the influence of the helical torsion spring 24 until it reaches the position shown in FIG. 2. The ejecting plunger 54 will, under the influence of the helical compression spring 56, force the cassette 53 partially from the pocket 52 of the carrier, overcoming the tension of the helical torsion spring 68 and pivoting the second bell crank 62 in a clockwise direction. When the carrier is swung upward, the control switch (not shown) operatively coupled thereto will interrupt electrical power to the drive motor, thus discontinuing rotary tape drive. As soon as the take-up reel in the cassette is disengaged from its associated spindle 28, the tension of the helical torsion spring 92 will force the sleeve 76 to rotate in the direction of drive, counterclockwise, and the drive pin 88 will be forced to conform once again to the semi-helical slot 90 in the sleeve through which it extends. Since this time only the sleeve and not the shaft 82 is rotating, the shaft will under go an upward, linear translation, it being free to slide axially with respect to the pulley 78 and hub 80 within the range of the limit pin's 84 travel within the slot 86 in the hub. As the shaft travels upward, the first bell crank 100 will be pivoted in a clockwise direction under the influence of the spring 104, bringing the pawl 106 once again into latching position. Once the tape cassette has been removed, the tape handler is ready to be loaded and operated through another cycle. Ideally, the cassette could be reversibly insertable and each tape could be recorded in both directions on half tracks, thus eliminating the need for rewinding.

OPERATION OF THE SECOND EMBODIMENT OF THE INVENTION

The operation of the second embodiment is basically the same as that previously described, with the exception of the drive coupler 110 (FIGS. 6, 7 and 8). When drive is being applied to the shaft 118, the second plate 114 is positioned such that the limiting hub 120 is in contact with the first plate 112 as shown in FIG. 7. When all of the tape has been transferred to the take-up reel in the cassette 53 and the spindle 28 is stopped by way of the trailing edge of the tape being anchored to the supply reel, the second plate will continue to turn for a short time, resulting in an angular displacement between the first and second plates. The second plate, being free to slide axially on the shaft, will, under the influence of the elongated resilient members 116—116, translate to a position illustrated by FIG. 8. The latching mechanism, being operatively coupled to the second plate, would, upon its translation, release the carrier 22, permitting it to swing away from the upper plate 38 under the influence of the helical torsion spring 24, thus disengaging tape drive and discontinuing electrical power to the drive motor.

While the tape cassette handler has been shown and described in considerable detail, it should be understood that many changes and variations may be made therein without departing from the spirit and scope of the invention.

What is claimed is:

1. An automatically disengaging, tape cassette handler comprising:

supporting means;

carrier means disposed on said supporting means for receiving a tape cassette typically having a tape supply reel and a take-up reel;

retracting means acting upon said carrier means tending to separate the same from said supporting means;

disengageable latching means for releasably securing said carrier means to said supporting means;

driven means for rotatably driving a tape take-up reel of a tape cassette received in said carrier means; and drive coupling means disposed on said supporting means for coupling rotary drive to said driven means, said coupling means being responsive to reactive counter-torque applied to said driven means for disengaging said latching means.

2. An automatically disengaging, tape cassette handler as defined by claim 1 having the addition of resilient means mounted on the carrier for at least partially ejecting a cassette inserted therein, said resilient means being a helical, compression-type spring compressibly engageable with the entering portion of the cassette.

3. An automatically disengaging, tape cassette handler as defined by claim 1 wherein said carrier means is pivotally mounted on said supporting means to swing away therefrom.

4. An automatically disengaging, tape cassette handler as defined by claim 3 wherein said retracting means is a helical torsion spring disposed coaxially to the pivotal axis of the carrier means and acting effectively between the carrier means and the supporting means.

5. An automatically disengageable, tape cassette handler as defined in claim 1 wherein said coupling means includes a rotary part which is axially translatable in response to the reactive counter-torque applied to said drive means.

6. An automatically disengaging, tape cassette handler as defined by claim 5 wherein said disengageable latching means comprises a pair of bell cranks pivotally mounted, one on said supporting means and the other on said carrier means, and forming an operative linkage between the rotary part of the drive coupling means and the carrier means for effecting release of the latter from securement to the supporting means.

7. An automatically disengaging, tape cassette handler as defined by claim 6 wherein the bell crank pivotally mounted on the carrier means also forms a stop effectively disposed in the ejection path of a cassette residing therein, thereby retaining a cassette within the carrier means until the latching means is disengaged.

8. An automatically disengaging, tape cassette handler as defined by claim 1 wherein said drive coupling means comprises a sleeve journaled in said supporting means and operatively coupled to said driven means, a hub connectible to a source of rotary drive and being coaxially spaced apart from said sleeve, a shaft drivingly received in the hub and being axially translatable relative thereto, said shaft extending into said sleeve, a drive pin affixed to and extending normally from said shaft through a semi-helical slot in said sleeve, and a resilient member rotatably coupling said sleeve to said shaft.

9. An automatically disengaging, tape cassette handler as defined by claim 8 wherein said resilient member is a helical torsion spring disposed coaxially about said shaft, said torsion spring being resiliently yieldable upon the application of a reactive counter-torque to said spindle, thereby causing said shaft to rotate within said sleeve and be axially translated as said drive pin cams within the helical slot.

10. An automatically disengaging, tape cassette handler as defined by claim 9 wherein said hub is rotatably mounted on said supporting means, and a limit pin is affixed to and extends normally from said shaft through an axially aligned slot in the hub, thereby limiting the axial translations of said shaft through said hub.

11. An automatically disengaging, tape cassette handler as defined by claim 1 wherein said drive coupling means comprises a first plate, a drive shaft perpendicularly secured to said first plate, a second plate slidably disposed on said shaft parallel to and spaced apart from said first plate, and a plurality of elongated resilient members axially and angularly coupling said first plate and said second plate.

12. An automatically disengaging, tape cassette handler as defined by claim 11 wherein said elongated resilient members extend obliquely and concentrically from said first plate to said second plate.

13. An automatically disengaging, tape cassette handler as defined by claim 12 having the addition of a limiting hub mounted on said second plate and extending toward said first plate for limiting axial contraction of said drive coupling means.

14. An automatically disengaging, tape cassette handler as defined by claim 13 wherein said first plate, said second plate and said elongated resilient members are formed as one piece of a hardened plastic material having an inherent flexibility.

15. A tape cassette handler comprising:

supporting means for receiving a tape cassette typically having a tape supply reel and take-up reel;

means for releasably retaining a tape cassette received by said supporting means;

a driven member journaled in said supporting means and operable to be coupled to and rotatably drive the take-up reel of a tape cassette releasably retained in said supporting means;

a drive member journaled in said supporting means coaxial with said driven member;

a coupling member drivingly connecting said drive and said driven members, one of the members having a limited axial degree of freedom and being axially translatable in one direction in response to an angular overrun of said drive member with respect to said driven member; and means operatively connected to said retaining means and responsive to movement of the axially translatable member for releasing said retaining means and for sufficiently separating the cassette from said supporting means to uncouple the take-up reel from said driven member.

16. A tape cassette handler including, in combination:

supporting means;

a carrier disposed on said supporting means and shaped to form a pocket for receiving a tape cassette typically having a tape supply reel and take-up reel;

disengageable latching means for releasably securing the carrier to the supporting means;

disengageable latching means for releasably securing a tape cassette in the pocket of the carrier;

driven means journaled in said supporting means for rotatably driving a take-up reel of a tape cassette releasably secured in the pocket of the carrier;

drive coupling means for coupling said driven means to a source of rotary drive; and means forming a part of said drive coupling means and responsive to reactive counter-torque applied to the driven means for disengaging both of said latching means to release the carrier from securement to the supporting means and a tape cassette from securement in the pocket of the carrier.

17. A tape cassette handler as defined in claim 16 wherein said means forming a part of the drive coupling means comprises a member having a permitted axial movement and effective when the rotary drive overruns the driven means to move axially, and wherein means is provided which responds to such axial movement for effecting disengagement of both of said latching means.

18. An automatically disengaging, tape cassette handler comprising:

a supporting structure;

a carrier mounted on said supporting structure and internally dimensioned to form a pocket in which a tape cassette is slidably receivable;

resilient means acting upon said carrier and tending to separate the same from said supporting structure;

disengageable latch means mounted on the supporting structure and operable in one position to secure the carrier to the supporting structure;

a driven spindle rotatable to drive a take-up reel of a tape cassette received in the pocket of said carrier;

a drive shaft effectively journaled in said supporting structure coaxial with said spindle and capable of axial translation;

a coupler enclosing adjacent ends of the spindle and shaft and forming a driving connection therebetween, said coupler being effective when the drive shaft overruns the spindle to cause the shaft to axially translate in one direction; and an arm forming part of the latch means extending into position to be engaged by the end portion of the shaft remote from the coupler and effective upon axial translation of the shaft in said one direction to disengage the latch means and free the carrier for separation from the supporting structure.

* * * * *